(12) United States Patent
Roberts et al.

(10) Patent No.: US 9,307,293 B2
(45) Date of Patent: Apr. 5, 2016

(54) COLLABORATIVE VIDEO APPLICATION FOR REMOTE SERVICING

(75) Inventors: Michael Roberts, Los Gatos, CA (US); Shane P. Ahern, Foster City, CA (US); Doron Kletter, San Mateo, CA (US); Anselm Hook, Palo Altom, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 981 days.

(21) Appl. No.: 13/484,172

(22) Filed: May 30, 2012

(65) Prior Publication Data
US 2013/0325970 A1   Dec. 5, 2013

(51) Int. Cl.
| | | |
|---|---|---|
| *G06F 15/173* | (2006.01) | |
| *H04N 21/4788* | (2011.01) | |
| *H04N 21/81* | (2011.01) | |
| *H04N 21/854* | (2011.01) | |

(52) U.S. Cl.
CPC ........... *H04N 21/4788* (2013.01); *H04N 21/81* (2013.01); *H04N 21/854* (2013.01)

(58) Field of Classification Search
None
See application file for complete search history.

(56) References Cited

U.S. PATENT DOCUMENTS

| | | | |
|---|---|---|---|
| 8,914,472 B1 * | 12/2014 | Lee et al. .................. | 709/219 |
| 2004/0054760 A1 | 3/2004 | Ewing et al. | |
| 2009/0064245 A1 * | 3/2009 | Facemire et al. .......... | 725/105 |
| 2010/0241691 A1 * | 9/2010 | Savitzky et al. ........... | 709/203 |
| 2011/0122220 A1 * | 5/2011 | Roberts et al. ............ | 348/14.04 |

OTHER PUBLICATIONS

Ewing et al. "Disaster Relief and Emergency Medical Services (DREAMS): Texas A&M Digital EMS and the Detection and Remediation of Chemical Threat Agents". Oct. 2004.*
Geoghegan, Brian, "A Reality Mobile White Paper—Mobile Video Collaboration", Reality Mobile, Nov. 1, 2010, www.realitymobile.com/sites/default/files/upload/resource_files/mobile_video_collaboration_-_a_reality_mobile_white_paper_november_2010_1.pdf.
Ableson, Frank, "Using XML and JSON with Android, Part 1: Explore the benefits of JSON and XML in Android applications", Jul. 20, 2010, www.ibm.com/developerworks/library/x-andbene1/x-andben1-pdf.pdf.
Ubi, Maite et al., "Introducing WebSockets: Bringing Sockets to the Web", HTML5 Rocks, Oct. 20, 2010, www.html5rocks.com, www.html5rocks.com/en/tutorials/websockets/basics/.

(Continued)

*Primary Examiner* — Scott B Christensen
(74) *Attorney, Agent, or Firm* — Shun Yao; Park, Vaughan, Fleming & Dowler LLP (57) ABSTRACT

One embodiment of the present invention provides a system for sharing annotated videos. During operation, the system establishes a real-time video-sharing session between a remote field computer and a local computer. During the established real-time video-sharing session, the system receives a real-time video stream from a remote field computer, forwards the real-time video stream to a local computer to allow an expert to provide an annotation to the real-time video stream, receives the annotation from the local computer, and forwards the annotation to the remote field computer, which associates the annotation with a corresponding portion of the real-time video stream and displays the annotation on top of the corresponding portion of the real-time video stream.

25 Claims, 5 Drawing Sheets

(56) References Cited

OTHER PUBLICATIONS

Diwakar, Sapan, "Using HTML5 Canvas Element to create cool tagging interface", sapandiwakar.in, Jun. 5, 2011, www.sapandiwakar.in/using-htm15-canvas-element-to-create-cool-tagging-interface/.

Hickson, Ian, "HTML5 A vocabulary and associated APIs for HTML and XHTML—W3C working draft May 25, 2011—Chapter 4.8.11 the canvas element", World Wide Web Consortium, W3C Working Drafts, www.w3.org/TR/2012/WD-html5-20120329/the-canvas-element.html#the-canvas-element.

* cited by examiner

COLLABORATIVE VIDEO APPLICATION FOR REMOTE SERVICING

BACKGROUND

1. Field

This disclosure is generally related to a remote servicing system. More specifically, this disclosure is related to a system that provides remote servicing using a collaboration video server.

2. Related Art

Remote servicing of complex equipment has gained popularity recently because it offers customers several advantages, including reduced response time and lowered maintenance and repair costs. In one remote servicing scenario, an expert technician of the equipment vendor can remotely assist and train an on-site novice (usually a maintenance staff member of the customer) to perform repairs or maintenance on a piece of equipment. This often requires remote, real-time interaction between the expert and the novice, during which the expert instructs the novice how to physically manipulate the equipment. Such interaction requires an exchange of detailed, real-time information about the equipment and maneuvers of the remote novice. Conventional communication techniques, such as phone calls or video conferencing, are not adequate in facilitating such interaction.

SUMMARY

One embodiment of the present invention provides a system for sharing annotated videos. During operation, the system establishes a real-time video-sharing session between a remote field computer and a local computer. During the established real-time video-sharing session, the system receives a real-time video stream from a remote field computer, forwards the real-time video stream to a local computer to allow an expert to provide an annotation to the real-time video stream, receives the annotation from the local computer, and forwards the annotation to the remote field computer, which associates the annotation with a corresponding portion of the real-time video stream and displays the annotation on top of the corresponding portion of the real-time video stream.

In a variation on this embodiment, forwarding the annotation involves: generating a message associated with the annotation and sending the message to the remote field computer.

In a further variation, the message is a JavaScript Object Notation (JSON) message.

In a variation on this embodiment, establishing the real-time video-sharing session involves creating a long-polling HTTP connection and/or establishing a WebSocket connection.

In a variation on this embodiment, the remote field computer includes at least one of: a head-mounted computer, a smartphone, a tablet computer, and a laptop computer.

In a variation on this embodiment, the annotation is a HyperText Markup Language (HTML) canvas object.

In a variation on this embodiment, the system receives a step-by-step procedure guide from the local computer, and the step-by-step guide includes annotated still images extracted from the real-time video stream.

In a variation on this embodiment, the system facilitates exchange of voice messages between the remote field computer and the local computer.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that runs a collaborative video application between a local web-based client and a remote field client. The remote field client runs on a head-mounted computer, thus enabling the remote user, which can be a trainee, to perform hands-free operations. The head-mounted computer is equipped with a video camera. Video streams taken by the camera can be shared among multiple clients, including the local web-based client. An expert user can view the video on the local web-based client. In addition, the system allows the expert user to annotate on top of the video, either on the live video stream or on images captured from the video stream. The sharing and annotation of the video streams allow the expert user to provide live, detailed instructions to a trainee or a novice user remotely in order to assist the trainee in performing certain servicing acts. In addition, the system allows the expert user to edit the annotated videos and produce a service manual based on the annotated videos.

Collaborative Video Application

During conventional assisted servicing of a complicated device, an expert technician is physically collocated with a novice to explain and demonstrate by physically manipulating the device. However, this approach to training or assisting the novice can be expensive and time-consuming because the expert technician often has to travel to a remote location where the novice and the device are located.

Remotely assisted servicing allows an expert to instruct a trainee or a novice remotely, thus significantly lowering the repair or maintenance costs of sophisticated equipment. During a remote servicing session, the novice physically manipulates the equipment; the expert, although not present physically, can provide instructions or give commands using a certain communication technique from a remote location. However, the information that can be exchanged using existing communication techniques is often inadequate for such remotely assisted servicing. For example, during a conference call audio, video, and text or graphical content are typically exchanged by the participants, but three-dimensional spatial relationship information, such as the spatial interrelationship between components in the device (e.g., how the components are assembled) is often unavailable. This is a problem because the expert technician does not have the ability to point and physically manipulate the device during a remote servicing session. Furthermore, the actions of the novice are not readily apparent to the expert technician unless the novice is able to effectively communicate his actions. Typically, relying on the novice to verbally explain his actions to the expert technician and vice versa is not effective because there is a significant knowledge gap between the novice and the expert technician. Consequently, it is often difficult for the expert technician and the novice to communicate regarding how to remotely perform servicing tasks.

In embodiments of the present invention, a collaborative video application run on a server-client system allows multiple clients to share and annotate real-time video streams. For example, an expert at a remote site can view the manipulation of a novice on the equipment through the live video stream as if the expert was "watching over the shoulder" of the novice. In addition, the application also allows the expert to provide assistance to the novice as needed by enabling real-time annotation, which means the expert can draw an arrow to point to or a circle to surround a component on the equipment when instructing the novice to perform certain actions on the component. For example, if the expert wants to instruct the novice to move a handle, the expert can extract a frame from the live video stream that shows the handle, draw an arrow pointing to the handle, and send the annotated frame to the novice.

Figure 1:
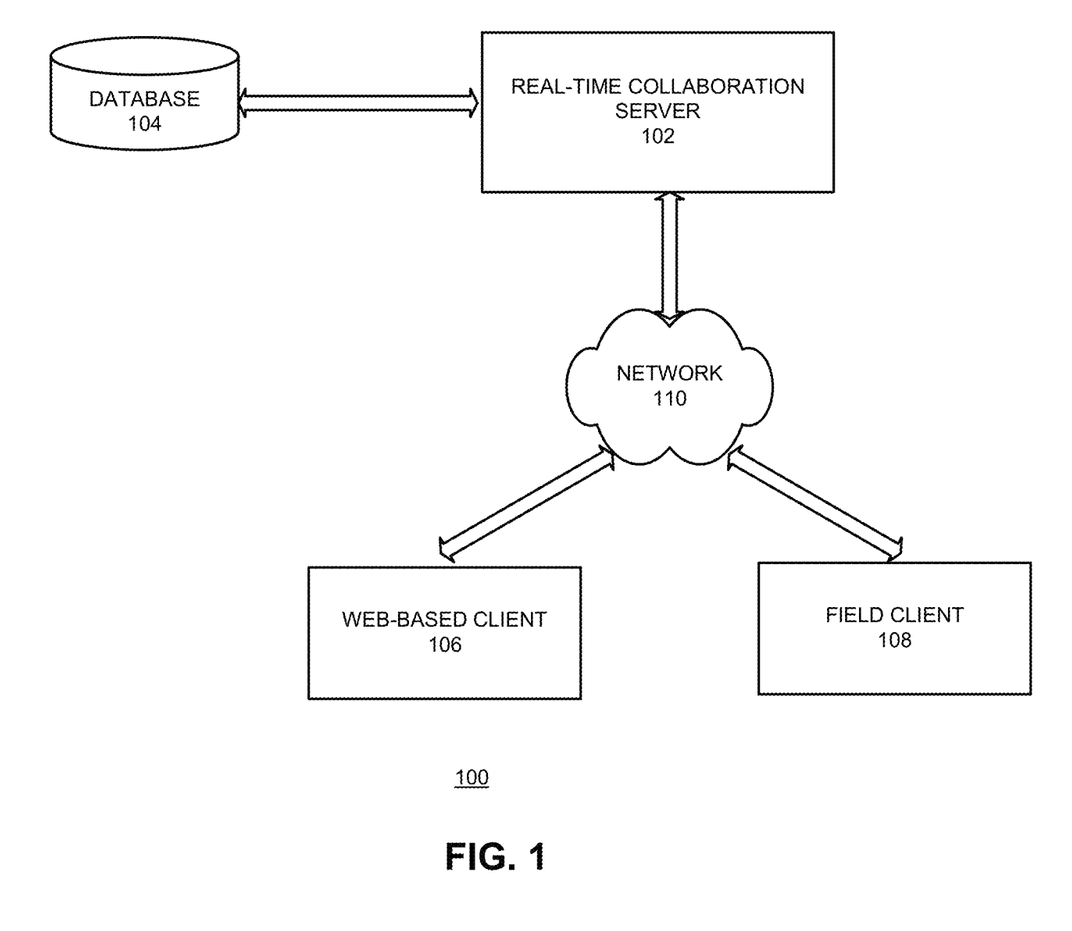
FIG. 1 presents a diagram illustrating an exemplary collaborative video-sharing system for video sharing and annotation, in accordance with an embodiment of the present invention.

FIG. 1 presents a diagram illustrating an exemplary collaborative video-sharing system for video sharing and annotation, in accordance with an embodiment of the present invention. In collaborative video-sharing system 100, a number of clients, such as a web-based client 106 and a field client 108, interact with each other and a real-time collaboration server 102 via a network 110.

Real-time collaboration server 102 enables the multiple clients, including web-based client 106 and field client 108, to exchange and share annotated live video streams. In addition, real-time collaboration server 102 interacts with database 104 to obtain various types of data, including but are not limited to: data associated with users, machines, steps, procedures, and media references.

Field client 108 may be an electronic device that can capture real-time video and stream the real-time video to real-time collaboration server 102. In one embodiment, field client 108 is a head-mounted computer (HMC), such as a Motorola™ Golden-i head-mounted computer, which allows a user to operate a cursor by moving his head and accepts voice command. These hands-free features allow the user of field client 108 to operate the computer while performing maintenance maneuvers on a piece of equipment. For example, a remote user wearing the HMC can operate a webcam installed on the HMC to capture real-time video, which when viewed by a local user allows the local user to "see" what is seen by the remote user. In addition, the HMC includes a display that can display video or video frames. In one embodiment, the HMC displays video frames that have been annotated by the local user, thus allowing the remote user to view instructions or listen to commands sent by the local user. In a different embodiment, field client 108 is conventional webcam hosted by a personal computer (PC) or a conventional web-enabled surveillance camera capable of capturing video and streaming the captured video to a remote server.

Web-based client 106 may be an electronic device that can stream real-time video from real-time collaboration server 102, display the real-time video to a user of web-based client 106, and perform certain video processing tasks, such as receiving frames extracted from the real-time video from real-time collaboration server 102 and annotating the extracted frames based on user input. Note that, in one embodiment, real-time collaboration server 102 receives frame-extraction instructions from an expert user via web-based client 106. In addition, web-based client 106 is able to upload the annotated video frames back to real-time collaboration server 102, which in turn forwards the annotated video frames to a remote user to allow the remote user to view instructions embedded in the annotated video frames. In one embodiment, web-based client 106 is a client computer running a web browser, such as Google Chrome™ or Mozilla Firefox™. In a further embodiment, video viewing on web-based client 106 is implemented using HTML 5 video support. A user, such as an expert, of web-based client 106 can view the real-time video as a web page.

In one embodiment, one of the multiple clients can be a mobile computing device, such as a laptop computer, a tablet computer, or a smartphone, which can function as either a web-based client or a field client. In a further embodiment, the mobile computing device combines the functionalities of the web-based client and the field client.

In some embodiments, field client 108 and web-based client 106 are client computers that interact with real-time collaboration server 102 in a client-server architecture. A given client computer may include one or more software applications that are resident on and which execute on the given client computer. A particular software application may be a stand-alone program or may be embedded in another software application. Alternatively, the software application may be a software-application tool that is embedded in a web page (e.g., the software application may execute in a virtual environment provided by a web browser).

More specifically, in some embodiments, collaborative video-sharing system 100 includes a number of web Application Programming Interfaces (APIs) running between the client computers and real-time collaboration server 102, with each web API including a defined set of HTTP request messages along with a definition of the structure of the response messages, typically expressed in JavaScript Object Notation (JSON) or Extensible Markup Language (XML). The web APIs include, but are not limited to: an authentication and user management API, a database API, a real-time API, a video API, and a media storage API. These APIs provide a shared video whiteboard among the multiple clients and the illusion of a shared collaborative space.

The authentication and user management API allows users of collaborative video-sharing system 100 to register with or log in to the system and create user sessions. The database API provides access to database 104. The real-time API enables real-time message exchange between real-time collaboration server 102 and the multiple clients. In one embodiment, the real-time API is implemented using a long polling HTTP connection, which enables a persistent or long-lasting HTTP connection between a server and a client computer. In one more embodiment, implementation of the real-time API involves establishing a WebSocket connection. Clients connect to the real-time API to receive real-time messages, either from other clients or from real-time collaboration server 102. In addition, the real-time API can also be used by the server or a client to "push" messages to other clients asynchronously, without the need for constant connection polling.

The video API enables the management and handling of video streams. Using the video API, clients (including web-based client 106 and field client 108) can "push" video data to and receive video data from real-time collaboration server 102. In one embodiment, the system also includes a video-control API that interacts with the video API to enable fine-grained control over the video stream, including allowing a client to capture still images from the video stream. The media storage API is in charge of storing media files (such as still images or video clips) in a file system or a media store associated with real-time collaboration server 102. Indexing information for the media files or "blobs" is stored in database 104, thus allowing queries of the stored media files. In one embodiment, the video API also includes functionalities that can capture messages associated with real-time annotations and associate these annotations with a captured video stream. This allows all activities on field client 108 to be stored for later synchronization with real-time collaboration server 102. If field client 108 is an HMC having limited connection bandwidth, all records of captured video and annotations are uploaded to real-time collaboration server 102 when the HMC is connected to a PC or docked.

Figure 2:
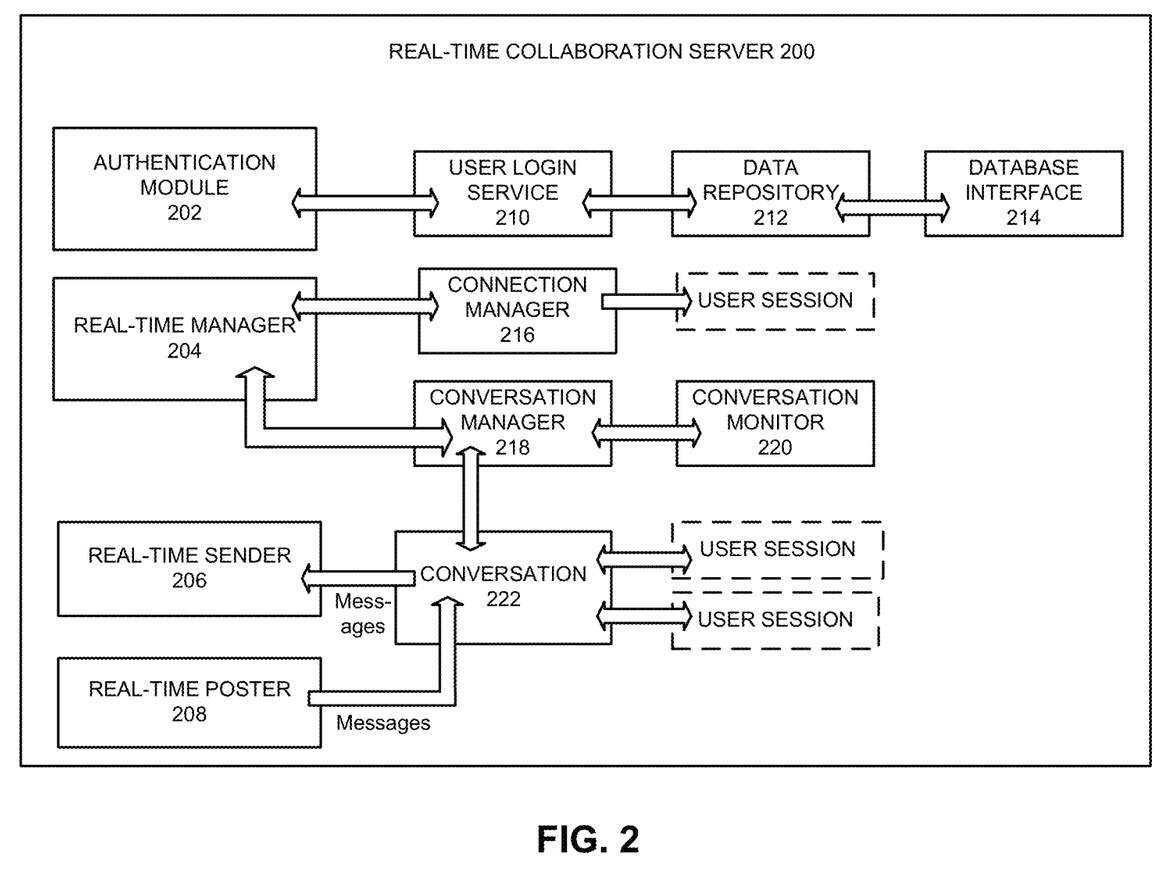
FIG. 2 presents a diagram illustrating the structure of an exemplary real-time collaboration server, in accordance with an embodiment of the present invention.

FIG. 2 presents a diagram illustrating the structure of an exemplary real-time collaboration server, in accordance with an embodiment of the present invention. A real-time collaboration server 200 includes an authentication module 202, a real-time manager 204, a real-time sender 206, and a real-time poster 208.

Authentication module 202 is responsible for handling user authentication processes, including user registration and login. In addition, authentication module 202 is involved in other aspects of user management, including adding new users or deleting existing users. In one embodiment, a web page for addition/deletion of users is provided to an administrator of the system to allow the administrator to add or delete users. In addition, a user registration page is provided to users of the system. Note that users of the system have defined roles as technicians and experts. Although all users are allowed to view video content submitted to real-time collaboration server 200, only expert users are allowed to edit or annotate the video content. During operation, authentication module 202 interacts with a user login service module 210, a data repository 212, which stores user registration information, and a database interface 214 in order to accomplish tasks associated with user authentication. The user registration information includes both video and voice endpoint information. Video endpoint information is used by clients to set up shared video streams, and voice endpoint information is used by clients to enable live voice communication during real-time collaboration sessions.

Real-time manager 204 is responsible for managing real-time connections between clients the real-time collaboration server 200. During operation, real-time manager 204 manages user sessions via a connection manager 216. In addition, real-time manager 204 also manages and monitors "conversations" (message exchanges) among the multiple clients by interacting with a conversation manager 218 and a conversation monitor 220.

Real-time sender 206 and real-time poster 208 facilitate "conversations" among the multiple clients via a conversation module 222. In one embodiment, conversation module 222 can be implemented as a chat room, enabling real-time communication among the multiple users, with each user establishing his own user session with the conversation module 222. The real-time communication includes, but is not limited to: videos, images, annotations on the videos or the images, and audio conversations. In one embodiment, an expert can create annotations on top of a video using an HTML canvas object, which allows the expert user to draw annotations on an image captured from the video, and the annotations can be expressed using a variety of common graphical elements, such as text, boxes, and freehand lines. For example, to explain a maintenance operation involving a certain component, the expert user can circle the component on an image captured from the live video and write detailed operation instructions at the bottom of the image. Note that once the annotation is created, a message is created expressing the annotation. In one embodiment, the message is in the form of JSON. The JSON message is subsequently pushed from the client to real-time collaboration server 200, which then distributes the JSON messages to all clients participating in the "conversation" (i.e., all users establishing user sessions with conversation module 222). For example, participants in an assisted service session may include an expert using the web-based client and multiple novices, each using his own field client. In one embodiment, each field client uploads its own video to real-time collaboration server 200 to allow users of other field clients to view the uploaded video. The expert may select one video stream from the multiple video streams to annotate, and distributes the annotated videos to users of all field clients via real-time collaboration server 200.

Figure 3:
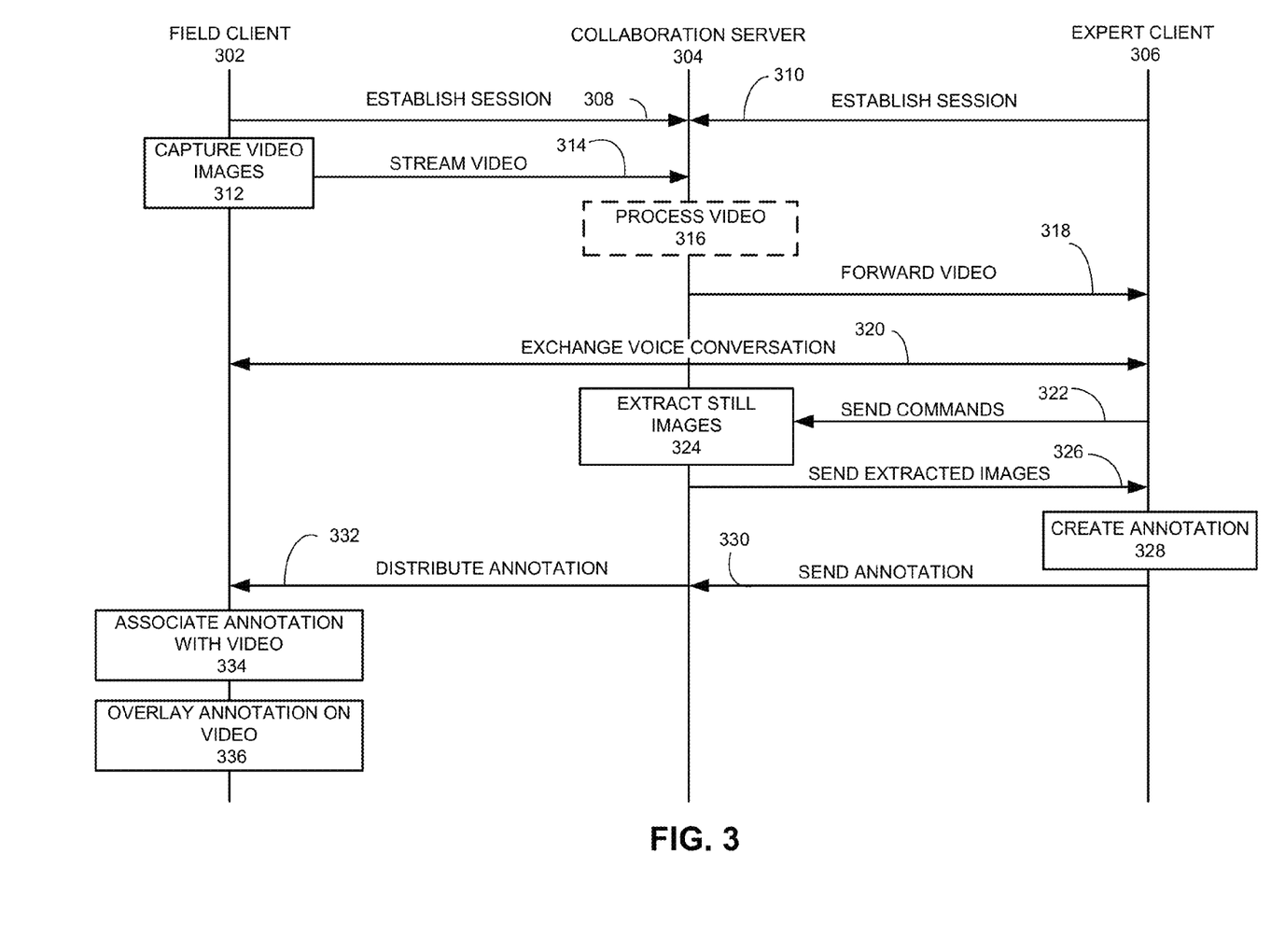
FIG. 3 presents a time-space diagram illustrating the real-time video-sharing process, in accordance with an embodiment of the present invention.

FIG. 3 presents a time-space diagram illustrating the real-time video-sharing process, in accordance with an embodiment of the present invention. During operation, a field client 302 and an expert client 306 both establish a user session with a collaboration server 304 (operations 308 and 310). Subsequently, field client 302 captures live video images (operation 312), and concurrently streams the live video images to collaboration server 304 (operation 314). The field client can be a head-mounted computer, a webcam hosted by a PC, a mobile computing device, or a web-enabled wired or wireless surveillance camera. Collaboration server 304 optionally processes the live video images (operation 316), and forwards the video to an expert client 306 (operation 318). For example, collaboration server 304 may cache the video for further use. An expert can view the video at expert client 306, thus being able to see what a novice is seeing at the remote site. For example, if the novice user is repairing a car engine, a camera mounted on field client 302 captures live videos showing the car engine and every movement of the novice. In one embodiment, expert client 306 can directly grab videos from field client 302, if expert client 306 is informed of the location of a video server associated with field client 302. However, in cases where field client 302 is behind a firewall or under other similar restrictions, expert client 306 cannot directly receive video from field client 302, and collaboration server 304 is needed to relay the video. Moreover, in situations where multiple other clients attempt to stream live videos from field client 302, due to its limited upstream bandwidth, field client 302 may not be able to satisfy all streaming requests from the multiple other clients, then collaboration server 304 is needed to relay the live videos to the multiple clients. Alternatively, the live videos can be distributed to the multiple other clients from filed client 302 using a multicast protocol or a content-centric networking (CCN) protocol.

In addition, users of field client 302 and expert client 306 can exchange voice conversation (operation 320). Note that the exchange of voice conversation between clients can be with or without the involvement of collaboration server 304.

While viewing the live videos, an expert user using expert client 306 can send commands to collaboration server 304 instructing collaboration server 304 to extract one or more still images from the live video (operations 322 and 324). Collaboration server 304 then sends the extracted still images back to expert client 306 to allow the expert user to annotate on top of the extracted images (operations 326 and 328). Subsequently, the annotation is sent back to collaboration server 304 (operation 330). In one embodiment, an annotation can be created by the expert user as an HTML canvas element. The creation of the annotation triggers a JSON message expressing the annotation to be created and sent to collaboration server 304. Collaboration server 304 subsequently distributes the annotation to other clients, such as field client 302 (operation 332). Field client 302 associates the annotation with corresponding video elements (operation 334), and overlays the annotation on top of the video elements, such as still images (operation 336).

Procedure Editor

In addition to facilitating real-time sharing of videos and annotations, the system also enables an expert user to edit service procedures using annotated video material. In one embodiment, the web-based client includes a procedure editor, which acts as an authoring tool to allow an expert user to compose a guide for a service procedure. In one embodiment, the procedure editor can be accessed by experts at the web-based client via a web browser. The procedure editor allows an expert to upload new images, links the uploaded images to service procedures/steps, tags/annotates the images, and adds textual descriptions.

For example, using videos taken by novices during servicing of a car engine, an expert user can create a video-based car engine service manual that can be viewed by a user at any time. More specifically, when a novice is servicing a car engine with the remote assistance of an expert user, the field client operated by the novice continuously captures videos showing the service process. The videos are streamed to the web-based client, at which the expert user views and annotates the videos. In addition to performing real-time annotation on the videos and sharing the real-time annotations with the field client, the expert user of the web-client can also edit the videos offline. In one embodiment, the expert can extract still images from one or more video streams (which can include video streams uploaded by different novice users), with one or more images corresponding to a particular step. The expert user can further make annotations on top of the extracted images and add a textual description. The annotated images along with the textual description can be used as a visual instruction for a person performing the particular service step. By extracting and annotating images associated with the different steps included in a service procedure, the expert can create a complete guide for the service procedure. Note that compared with conventional methods for creating service manuals or guides, embodiments of the present invention do not require an expert to collect content intentionally. Instead, the content is collected during various live assisted service sessions by field clients.

In one embodiment, the collected content is associated with different machines, with a machine exhibiting a number of procedures, each of which includes an ordered list of steps. The expert-created service guide for machines, procedures, or steps can be stored in the system database and can be queried by other field clients. For example, before a novice performs a certain procedure or step, he may search the system database for a guide (previously created by an expert) to the procedure or step. Note that because the procedure guide includes images or videos along with annotations and textual descriptions, it can provide detailed instruction to the novice.

Because an expert may create the service procedure guide using videos obtained from multiple assisted service sessions, he can combine knowledge gained from the multiple sessions with each session providing a unique perspective. Moreover, the expert can continue to update the content of the procedure guide using knowledge gained from assisting other novices. In one embodiment, the expert user may update the procedure guide on the web-based client offline, and the updated procedure guide is synchronized with the procedure guide stored in the database when the web-based client is again connected. This can be done using a hashing API. Note that as the system is used it continues to capture knowledge and information in the domain of use, thus becoming more useful with age.

Figure 4:
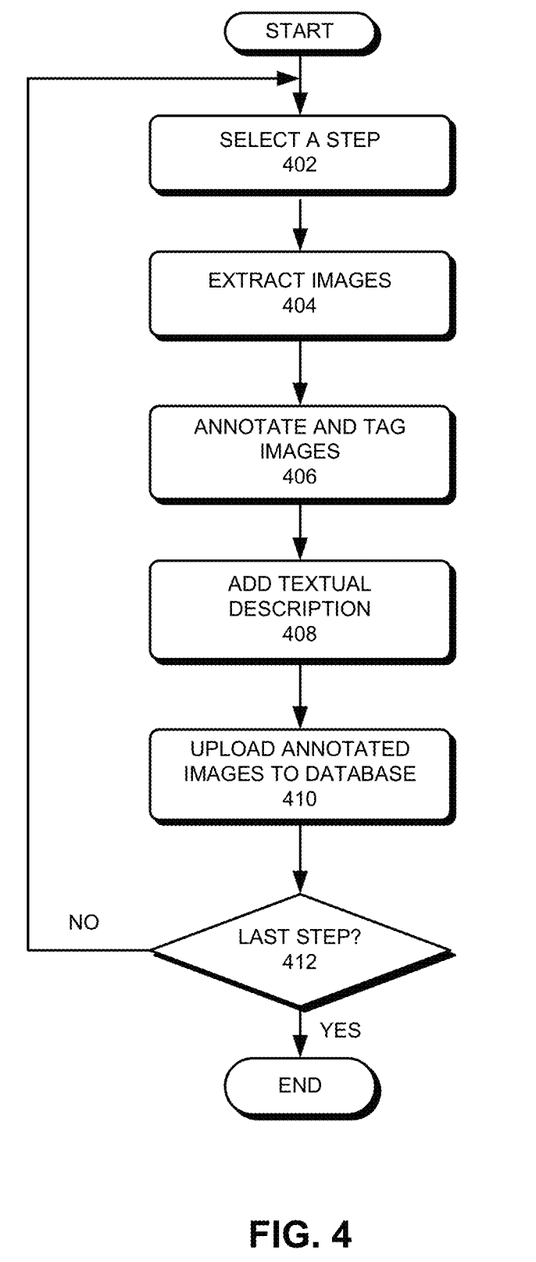
FIG. 4 presents a flowchart illustrating the process of creating a procedure guide, in accordance with an embodiment of the present invention.

FIG. 4 presents a flowchart illustrating the process of creating a procedure guide, in accordance with an embodiment of the present invention. During operation, the expert selects a step within a procedure (operation 402), and extracts one or more images associated with the selected step from one or more video streams taken during remote-assisted service sessions (operation 404). Subsequently, the expert annotates and tags the images (operation 406), and adds a textual description (operation 408). The annotation and the textual description together explain how to perform the selected step to a viewer. In one embodiment, the expert may create animated annotations. The annotated images are then uploaded to the system database (operation 410). The expert determines whether the selected step is the last step within the procedure (operation 412). If so, the process ends. If not, the expert selects a next step (operation 402).

Computer Systems

Figure 5:
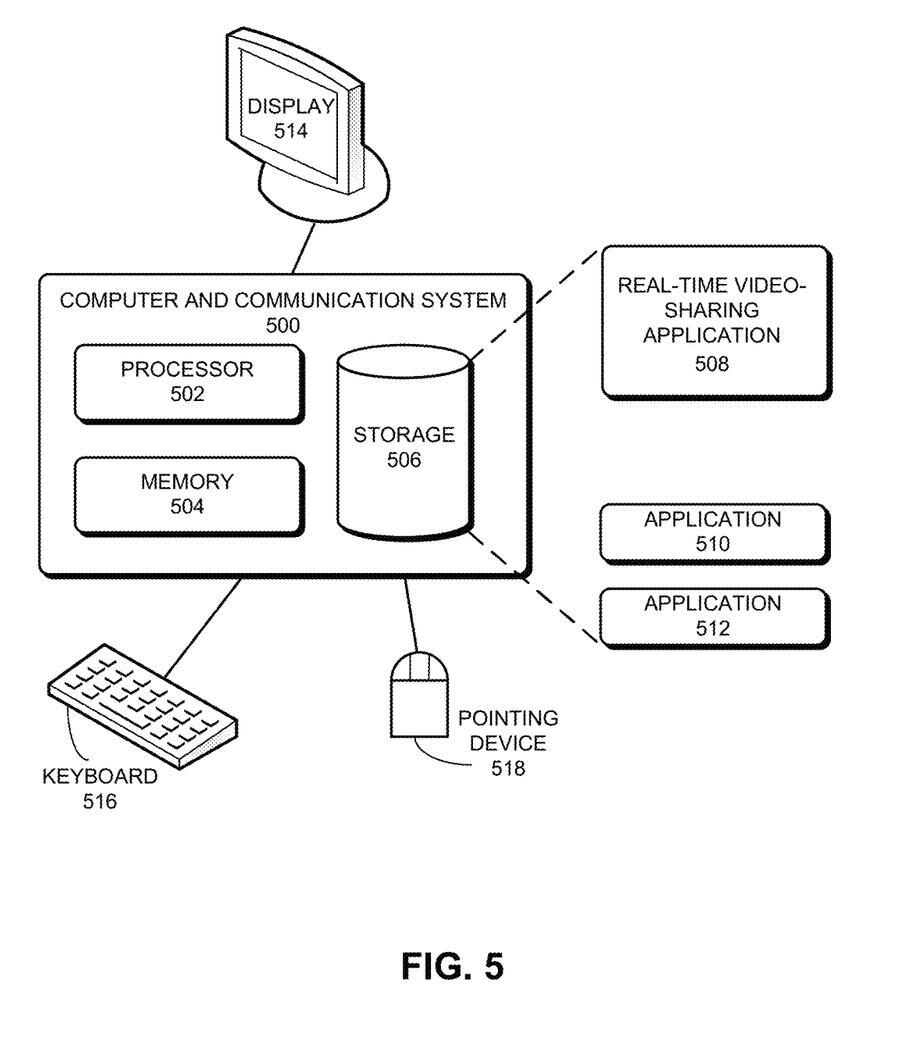
FIG. 5 illustrates an exemplary computer system for real-time sharing of annotated videos, in accordance with one embodiment of the present invention.

FIG. 5 illustrates an exemplary computer system for real-time sharing of annotated videos, in accordance with one embodiment of the present invention. In one embodiment, a computer and communication system 500 includes a processor 502, a memory 504, and a storage device 506. Storage device 506 stores a real-time video-sharing application 508, as well as other applications, such as applications 510 and 512. During operation, real-time video-sharing application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for sharing annotated videos, the method comprising:
    establishing, by a collaboration server, a real-time video-sharing session between a remote field computer and a client computer associated with an expert on a procedure; and
    during the established real-time video-sharing session:
        receiving a real-time video stream from the remote field computer;
        forwarding the real-time video stream to the client computer to allow the expert to provide an annotation to the real-time video stream;
        receiving, from the client computer, a command to extract a still image from the video stream;
        extracting the still image from the video stream in response to the received command;
        forwarding the still image to the client computer for annotation by the expert;
        receiving the annotation associated with the procedure from the client computer; and
        forwarding the annotation to the remote field computer, which associates the annotation with a corresponding portion of the real-time video stream and displays the annotation on top of the corresponding portion of the real-time video stream.

2. The method of claim 1, wherein forwarding the annotation involves:
    generating a message associated with the annotation; and
    sending the message to the remote field computer.

3. The method of claim 2, wherein generating the message involves generating a JavaScript Object Notation (JSON) message that includes the annotation.

4. The method of claim 1, wherein establishing the real-time video-sharing session involves creating a long-polling HTTP connection and/or establishing a WebSocket connection for the real-time video-sharing session.

5. The method of claim 1, wherein the remote field computer includes at least one of:
    a head-mounted computer;
    a smartphone;
    a tablet computer; and
    a laptop computer.

6. The method of claim 1, wherein the annotation is a HyperText Markup Language (HTML) canvas object.

7. The method of claim 1, further comprising:
    sending a set of extracted media segments associated with a step of the procedure, from multiple real-time video-sharing sessions, to a client computer of an expert, to allow the expert to generate a step-by-step procedure guide for the procedure; and
    receiving the step-by-step procedure guide from the client computer, wherein the step-by-step procedure guide includes the set of media segments and a description associated with the step.

8. The method of claim 1, further comprising facilitating an exchange of voice messages between the remote field computer and the local computer.

9. A non-transitory computer-readable storage medium storing instructions that when executed by a computer cause the computer to perform a method for sharing annotated videos, the method comprising:
    establishing a real-time video-sharing session between a remote field computer and a client computer associated with an expert on a procedure; and
    during the established real-time video-sharing session:
        receiving a real-time video stream from the remote field computer;
        forwarding the real-time video stream to the client computer to allow the expert to provide an annotation to the real-time video stream;
        receiving, from the client computer, a command to extract a still image from the video stream;
        extracting the still image from the video stream in response to the received command;
        forwarding the still image to the client computer for annotation by the expert;
        receiving the annotation associated with the procedure from the client computer; and
        forwarding the annotation to the remote field computer, which associates the annotation with a corresponding portion of the real-time video stream and displays the annotation on top of the corresponding portion of the real-time video stream.

10. The non-transitory computer-readable storage medium of claim 9, wherein forwarding the annotation involves:
    generating a message associated with the annotation; and
    sending the message to the remote field computer.

11. The non-transitory computer-readable storage medium of claim 10, wherein generating the message involves generating a JavaScript Object Notation (JSON) message that includes the annotation.

12. The non-transitory computer-readable storage medium of claim 9, wherein establishing the real-time video-sharing session involves creating a long-polling HTTP connection and/or establishing a WebSocket connection for the real-time video-sharing session.

13. The non-transitory computer-readable storage medium of claim 9, wherein the remote field computer includes at least one of:
    a head-mounted computer;
    a smartphone;
    a tablet computer; and
    a laptop computer.

14. The non-transitory computer-readable storage medium of claim 9, wherein the annotation is a HyperText Markup Language (HTML) canvas object.

15. The non-transitory computer-readable storage medium of claim 9, wherein the method further comprises:
    sending a set of extracted media segments associated with a step of the procedure, from multiple real-time video-sharing sessions, to a client computer of an expert, to allow the expert to generate a step-by-step procedure guide for the procedure; and
    receiving the step-by-step procedure guide from the client computer, wherein the step-by-step procedure guide includes the set of media segments and a description associated with the step.

16. The non-transitory computer-readable storage medium of claim 9, wherein the method further comprises facilitating an exchange of voice messages between the remote field computer and the local computer.

17. A computing system for sharing annotated videos, the system comprising:
    a remote field computer;
    a client computer associated with an expert on a procedure; and a video-sharing collaboration server, further comprising:
- a session-establishing mechanism configured to establish a real-time video-sharing session between a remote field computer and a client computer associated with an expert on a procedure;
- a video-receiving mechanism configured to receive, during the real-time video-sharing session, a real-time video stream from the remote field computer;
- a video-forwarding mechanism configured to forward, during the real-time video-sharing session, the real-time video stream to the client computer to allow the expert to provide an annotation to the real-time video stream;
- a command-receiving mechanism, configured to receive from the client computer, during the real-time video-sharing session, a command to extract a still image from the video stream;
- an image-extracting mechanism, configured to extract, during the real-time video-sharing session, a still image from the video stream in response to the received command;
- an image-forwarding mechanism, configured to forward, during the real-time video-sharing session, the still image to the client computer for annotation by the expert;
- an annotation-receiving mechanism configured to receive, during the real-time video-sharing session, the annotation associated with the procedure from the client computer; and
- an annotation-forwarding mechanism configured to forward the annotation to the remote field client, which associates the annotation with a corresponding portion of the real-time video stream.

18. The system of claim 17, wherein while forwarding the annotation, the annotation-forwarding mechanism is further configured to:
   generate a message associated with the annotation; and
   send the message to the remote field computer.

19. The system of claim 18, wherein generating the message involves generating a JavaScript Object Notation (JSON) message that includes the annotation.

20. The system of claim 17, wherein the session-establishing mechanism is configured to create a long-polling HTTP connection and/or establish a WebSocket connection for the real-time video-sharing session.

21. The system of claim 17, wherein the remote field computer includes at least one of:
   a head-mounted computer;
   a smartphone;
   a tablet computer; and
   a laptop computer.

22. The system of claim 17, wherein the annotation is a HyperText Markup Language (HTML) canvas object.

23. The system of claim 17, wherein the video-sharing server further comprises:
   a media-sending mechanism configured to send a set of extracted media segments associated with a step of the procedure, from multiple real-time video-sharing sessions, to a client computer of an expert, to allow the expert to generate a step-by-step procedure guide for the procedure; and
   a procedure-receiving mechanism configured to receive the step-by-step procedure guide from the client computer, wherein the step-by-step procedure guide includes the set of media segments and a description associated with the step.

24. The system of claim 17, wherein the video-sharing server further comprises a mechanism that facilitates an exchange of voice messages between the remote field computer and the local computer.

25. The method of claim 17, further comprising storing the annotation and at least an extracted media segment of the real-time video stream in an indexed media store in association with the procedure, wherein the captured media segment includes the still image or a captured video clip.

\* \* \* \* \*